United States Patent
Katayama et al.

(10) Patent No.: US 12,139,152 B2
(45) Date of Patent: Nov. 12, 2024

(54) IN-VEHICLE ELECTRONIC CONTROL UNIT AND COMPUTER READABLE MEDIUM

(71) Applicant: Mitsubishi Electric Corporation, Tokyo (JP)

(72) Inventors: Yoshiaki Katayama, Tokyo (JP); Yuya Takatsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 396 days.

(21) Appl. No.: 17/518,040

(22) Filed: Nov. 3, 2021

(65) Prior Publication Data
US 2022/0055637 A1 Feb. 24, 2022

Related U.S. Application Data

(63) Continuation of application No. PCT/JP2019/025741, filed on Jun. 27, 2019.

(51) Int. Cl.
*B60W 50/02* (2012.01)
*B60W 50/023* (2012.01)
(Continued)

(52) U.S. Cl.
CPC .... *B60W 50/0225* (2013.01); *B60W 50/0205* (2013.01); *B60W 50/023* (2013.01);
(Continued)

(58) Field of Classification Search
CPC ......... B60W 50/0225; B60W 50/0205; B60W 50/023; G05B 23/0283; G06F 9/45558; G06F 21/55
(Continued)

(56) References Cited

U.S. PATENT DOCUMENTS 9,405,601 B2 * 8/2016 Ito ..................... G05B 15/00
10,983,823 B2 * 4/2021 Sato ................... G06F 9/4887
(Continued)

FOREIGN PATENT DOCUMENTS

JP 2002-221075 A 8/2002
JP 2004-338630 A 12/2004
(Continued)

OTHER PUBLICATIONS

International Search Report (PCT/ISA/210) issued in PCT/JP2019/025741, mailed on Sep. 3, 2019.

*Primary Examiner* — Peter D Nolan
*Assistant Examiner* — Luke Huynh
(74) *Attorney, Agent, or Firm* — Birch, Stewart, Kolasch & Birch, LLP (57) ABSTRACT

A management domain unit is connected, via an independent virtual network (95) using a hypervisor unit, to a separate management domain unit (B) (10B) of a separate electronic control unit ECU (B) (1) having the separate management domain unit (B) (10B) and a separate basic domain unit (A) (50B) which substitutes for a basic domain unit. When an abnormality of the basic domain unit is detected, the management domain unit halts operation of the basic domain unit, and causes the separate management domain unit (B) (10B) possessed by the separate electronic control unit ECU (B) (1) to start operation of the separate basic domain unit (A) (50B).

8 Claims, 10 Drawing Sheets

(51) Int. Cl.
*G05B 23/02* (2006.01)
*G06F 9/455* (2018.01)
*G06F 21/55* (2013.01)

(52) U.S. Cl.
CPC ..... *G05B 23/0283* (2013.01); *G06F 9/45558* (2013.01); *G06F 21/55* (2013.01); *G05B 2223/06* (2018.08); *G06F 2009/45587* (2013.01)

(58) Field of Classification Search
USPC ....................................................... 701/29.2
See application file for complete search history.

(56) References Cited

U.S. PATENT DOCUMENTS

| | | |
|---|---|---|
| 2002/0099487 A1 | 7/2002 | Suganuma et al. |
| 2006/0015231 A1 | 1/2006 | Yoshimura et al. |
| 2010/0030421 A1 | 2/2010 | Yoshimura et al. |
| 2012/0254951 A1 | 10/2012 | Munetoh et al. |
| 2012/0297452 A1 | 11/2012 | Munetoh et al. |
| 2014/0188343 A1 | 7/2014 | Yoshimura et al. |
| 2015/0100207 A1 | 4/2015 | Yoshimura et al. |
| 2020/0233702 A1* | 7/2020 | Okabe ................... G06F 11/301 |

FOREIGN PATENT DOCUMENTS

| | | |
|---|---|---|
| JP | 2009-227276 A | 10/2009 |
| JP | 2010-211339 A | 9/2010 |
| JP | 2010-285001 A | 12/2010 |
| JP | 2012-212391 A | 11/2012 |
| JP | 2018-99972 A | 6/2018 |
| WO | WO 2018/008605 A1 | 1/2018 |

\* cited by examiner

| DOMAIN ID | 8 | 7 | 6 | 5 | 4 | 3 | 2 | 1 |
|---|---|---|---|---|---|---|---|---|
| INFECTION PRESENCE/ABSENCE | 0 | 0 | 0 | 0 | 1 | 1 | 0 | 0 |

| DOMAIN ID | 8 | 7 | 6 | 5 | 4 | 3 | 2 | 1 |
|---|---|---|---|---|---|---|---|---|
| SUBSTITUTE PRESENCE/ABSENCE | 0 | 0 | 0 | 0 | 0 | 0 | 1 | 1 |

IN-VEHICLE ELECTRONIC CONTROL UNIT AND COMPUTER READABLE MEDIUM

CROSS REFERENCE TO RELATED APPLICATIONS

This application is a Continuation of PCT International Application PCT/JP2019/025741, filed on Jun. 27, 2019, which is hereby expressly incorporated by reference into the present application.

TECHNICAL FIELD

The present invention relates to an electronic control unit installed in a vehicle. The present invention relates to reliability of an in-vehicle system to which a plurality of electronic control units (ECUs) are connected via a network. In the following, the electronic control unit is expressed as ECU.

BACKGROUND ART

In a conventional in-vehicle system, to prepare against a failure of an ECU, a function of the ECU is transferred to another ECU on the basis of a failure probability of the ECU. As a result, even if the ECU should fail, since another ECU is running the function that has already been transferred, an inconvenience of a function halt can be prevented (for example, Patent Literature 1).

CITATION LIST

Patent Literature

Patent Literature 1: JP 2018-99972 A

SUMMARY OF INVENTION

Technical Problem

However, in the conventional in-vehicle system, the function of the ECU is transferred to another ECU on the basis of the failure probability of the ECU.

Accordingly, if a failure occurs in an ECU that has a low failure probability and has been determined as failure-free, it is possible that a function of the ECU in which the failure has occurred cannot be transferred to another ECU. Also, even if the function can be transferred, a burden of communication processing for transferring the function of the ECU in which the failure has occurred to another ECU is large.

An objective of the present invention is to provide an in-vehicle system that enables smooth continuation of a function essential to the in-vehicle system when an abnormality such as a failure actually occurs.

Solution to Problem

An electronic control unit of the present invention, which is to be installed in a vehicle, includes:
an extended domain unit which operates under a first operating system, is connected to an extra-vehicular network, and can be halted when an abnormality occurs;
a basic domain unit which operates under a second operating system, is connected to the extended domain unit, and is required to continue operation when an abnormality occurs;
a management domain unit which operates under a third operating system, and halts operation of the extended domain unit when the abnormality of the extended domain unit is detected; and
a hypervisor unit which causes the first operating system, the second operating system, and the third operating system, to operate,
wherein the management domain unit is connected, via an independent virtual network using the hypervisor unit, to a separate management domain unit of a separate electronic control unit having the separate management domain unit and a separate basic domain unit which substitutes for the basic domain unit; and when an abnormality of the basic domain unit is detected, the management domain unit halts operation of the basic domain unit, and causes the separate management domain unit possessed by the separate electronic control unit to start operation of the separate basic domain unit.

Advantageous Effects of Invention

An electronic control unit of the present invention is provided with a management domain unit. Therefore, according to the electronic control unit of the present invention, when an abnormality such as a failure actually occurs, a function essential for an in-vehicle system can be continued smoothly.

DESCRIPTION OF EMBODIMENTS

Embodiments of the present invention will be described below with referring to drawings. In the drawings, the same or equivalent portions are denoted by the same reference sign. In description of the embodiments, the same or equivalent portions will not be described, or will be described only briefly, as necessary. In the following description, an application will be expressed as app.

(1) In the following description, an operation system will be expressed as OS.
(2) In the following description, an Input/Output (UO) device will be expressed as I/O.

(3) In the following description, an in-vehicle system 100 handles infection caused by a cyberattack or failure, which is an abnormality. In the following description, an abnormality signifies infection caused by a cyberattack in an ECU, or a failure in an ECU. However, an abnormality may signify another abnormality.

Embodiment 1

Description of Configurations

An in-vehicle system 100 according to Embodiment 1 will be described with referring to FIGS. 1 to 8.

Figure 1:
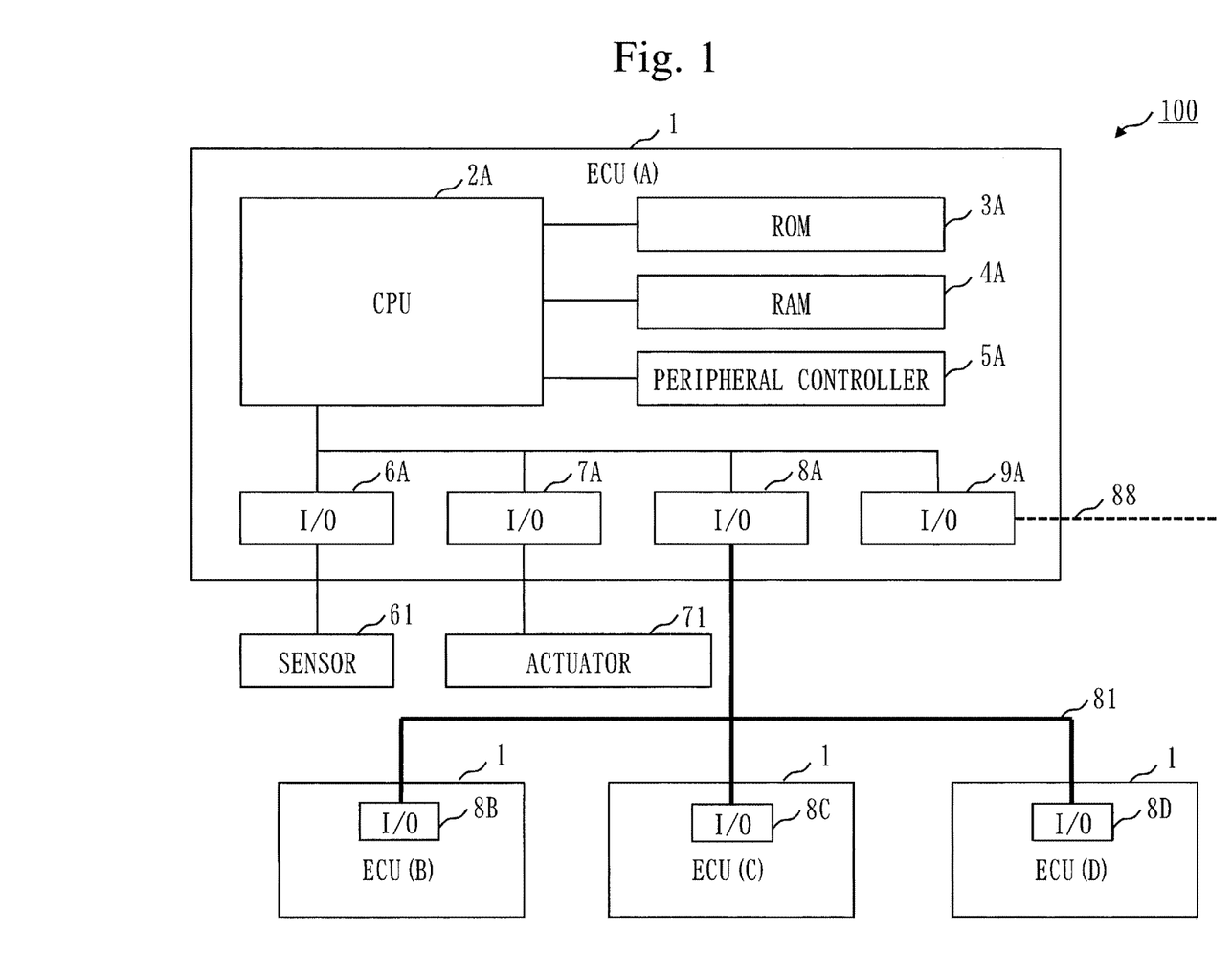
FIG. 1 is a drawing of Embodiment 1 which is a hardware configuration diagram of an in-vehicle system 100.

FIG. 1 is a hardware configuration diagram of the in-vehicle system 100. The in-vehicle system 100 is provided with a plurality of ECUs. The plurality of ECUs are installed in a vehicle. The ECUs are connected to each other via an intra-vehicular network 81. FIG. 1 illustrates a configuration in which the in-vehicle system 100 is provided with four ECUs. The plurality of ECUs provided to the in-vehicle system 100 may include two, three, or five or more ECUs. In the following, for the sake of distinction, four ECUs are expressed as an ECU (A) 1, an ECU (B) 1, an ECU (C) 1, and an ECU (D) 1. Each ECU is connected to an external system via an extra-vehicular network 88.

The ECU (A) 1, the ECU (B) 1, the ECU (C) 1, and the ECU (D) 1 have the same hardware configuration. Hence, a description of the ECU (A) 1 applies to the ECU (B) 1, the ECU (C) 1, and the ECU (D) 1 as well. FIG. 1 illustrates a hardware configuration of the ECU (A) 1. A hardware configuration of an ECU will be described with referring to the ECU (A) 1. The ECU (A) 1 is provided with at least one Central Processing Unit (CPU) 2A, a Read-Only Memory (ROM) 3A, a Random-Access Memory (RAM) 4A, a peripheral controller 5A, and Input/Output (I/O) devices 6A, 7A, 8A, and 9A. The CPU 2A, the ROM 3A, the RAM 4A, the peripheral controller 5A, the I/O 6A, the I/O 7A, the I/O 8A, and the I/O 9A are connected to each other via a bus.

The ROM 3A is a non-volatile memory such as an Electrically Erasable Programmable ROM (EEPROM) and a flash memory. An application program which implements a function provided by the ECU 1, an OS program, and data are recorded in the ROM 3A.

The RAM 4A is a volatile memory and stores a program and data necessary for a CPU 2 to perform processing.

The peripheral controller 5A is a device such as an interrupt controller, a timer controller, and a Direct Memory Access (DMA) controller.

The I/Os 6A, 7A, 8A, and 9A are each a circuit such as a General Purpose I/O (GPIO), an A/D conversion circuit, a D/A conversion circuit, a motor drive circuit, and a communication interface circuit. The I/O 6A is connected to a sensor 61. The I/O 7A is connected to an actuator 71. The I/O 8A is connected to an I/O 8B of the ECU (B) 1, an I/O 8C of the ECU (C) 1, and an I/O 8D of the ECU (D) 1. The I/O 9A is connected to the extra-vehicular network 88.

The CPU 2A reads programs stored in the ROM 3A and RAM 4A, and repeats computation processing on the basis of a value read from the sensor 61 and processing such as controlling the actuator 71. The sensor 61 is, for example, a water-temperature sensor or a throttle aperture sensor. The actuator 71 is, for example, an injector and igniter.

The intra-vehicular network 81 is a network such as a Controller Area Network (CAN), a Local Interconnect Network (LIN), and a FlexRay.

The extra-vehicular network 88 is connected to the Internet via mobile communication such as Wi-Fi, Long Term Evolution (LTE), and 5G.

Figure 2:
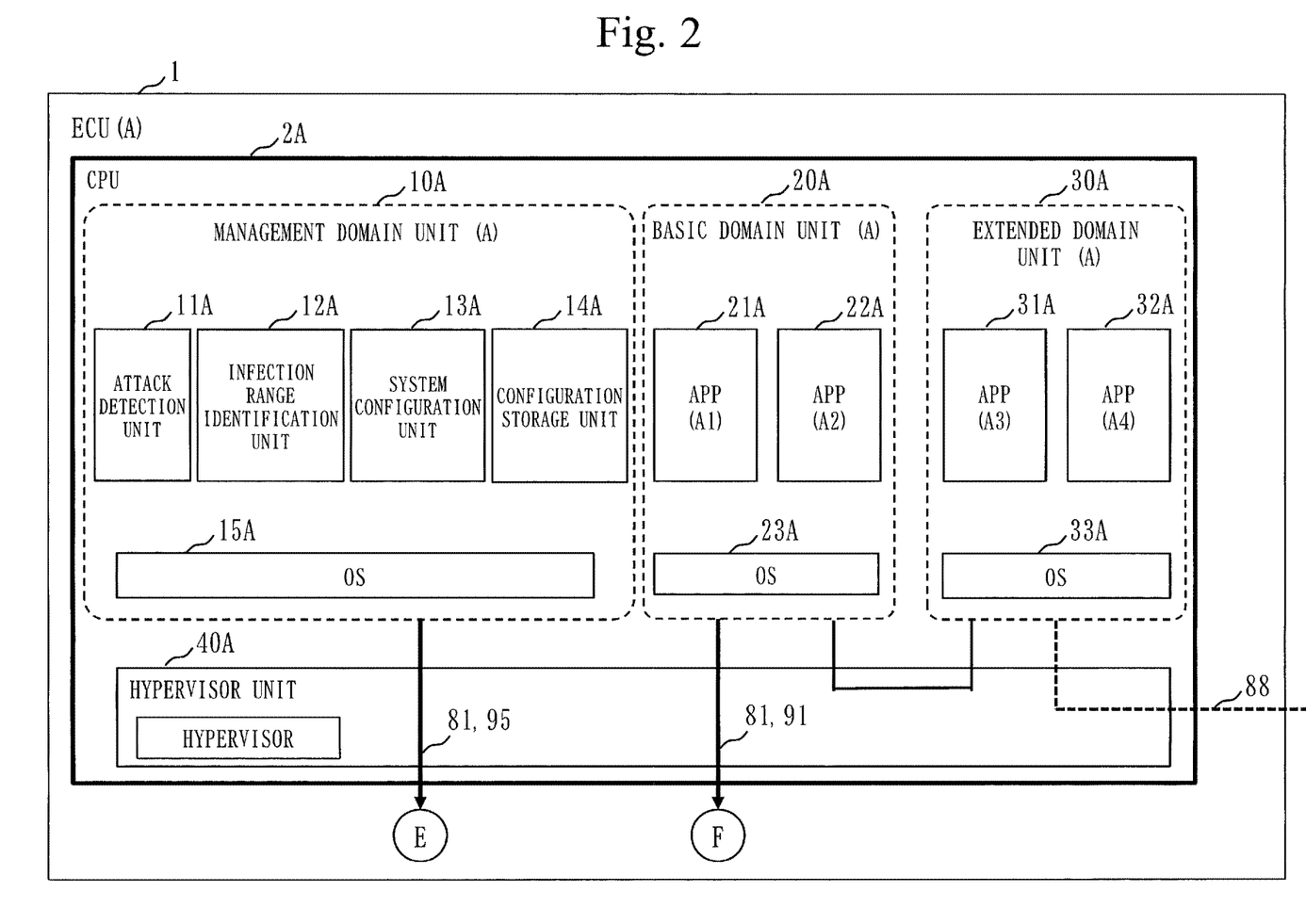
FIG. 2 is a drawing of Embodiment 1 which is a software configuration diagram of the in-vehicle system 100.
Figure 3:
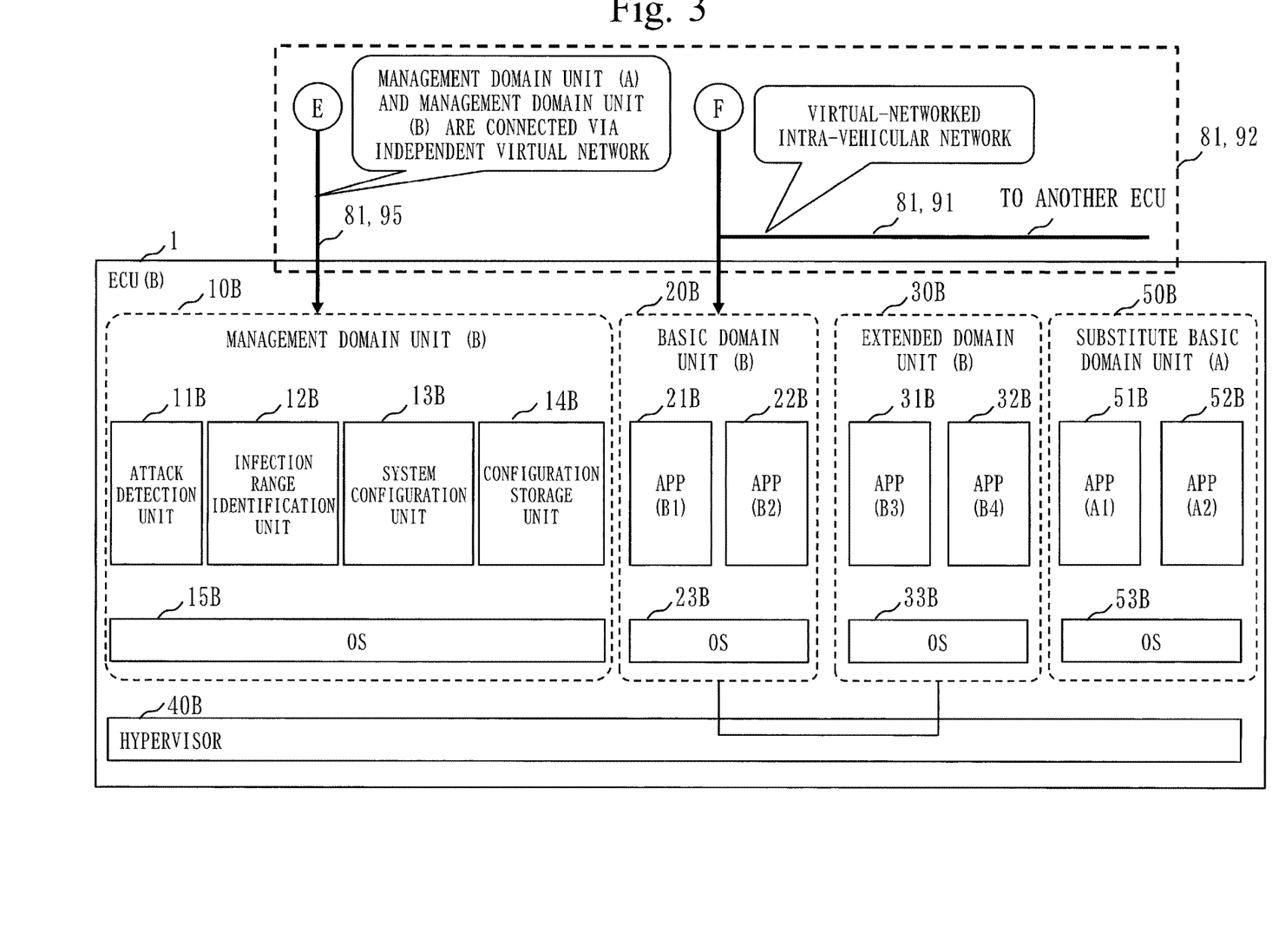
FIG. 3 is a drawing of Embodiment 1 which is a software configuration diagram of the in-vehicle system 100.

FIGS. 2 and 3 illustrate software configuration of the in-vehicle system 100, The ECU (A) 1 and the ECU (B) 1 are separated for convenience between FIGS. 2 and 3 by E and F. FIGS. 2 and 3 illustrate a management domain unit (A) 10A being connected to a management domain unit (B) 10B via the intra-vehicular network 81, and a basic domain unit (A) 20A being connected to a basic domain unit (B) 20B via the intra-vehicular network 81. The intra-vehicular network 81 is a virtual network 91, as will be described later.

As illustrated in FIG. 2, the management domain unit (A) 10A, the basic domain unit (A) 20A, an extended domain unit (A) 30A, and a hypervisor unit 40A are implemented by the CPU 2A. The management domain unit (A) 10A, the basic domain unit (A) 20A, the extended domain unit (A) 30A, and the hypervisor unit 40A are programs. The CPU 2A may be implemented by a single CPU or by a plurality of CPUs. The single CPU and the plurality of CPUs are referred to as processing circuitry as well. Functions of the management domain unit (A) 10A, basic domain unit (A) 20A, extended domain unit (A) 30A, and hypervisor unit 40A are implemented by processing circuitry. Programs that implement the management domain unit (A) 10A, basic domain unit (A) 20A, extended domain unit (A) 30A, and hypervisor unit 40A are stored in the ROM 3A and the RAM 4A.

Programs that implement the management domain unit (A) 10A, basic domain unit (A) 20A, extended domain unit (A) 30A, and hypervisor unit 40A may be provided as being stored in a computer-readable recording medium, or may be provided as a program product.

In the programs, the management domain unit (A) 10A corresponds to a management function process, the basic domain unit (A) 20A corresponds to a basic function process, the extended domain unit (A) 30A corresponds to an extended function process, and the hypervisor unit 40A corresponds to a hypervisor process.

The hypervisor unit 40A causes an OS 33A being a first operating system, an OS 23A being a second operating system, and an OS 15A being a third operating system, to operate. The hypervisor unit 40A runs a hypervisor. The hypervisor is also called a virtual machine monitor, which is software for causing a plurality of OSs to operate on the ECU (A) 1. Each of the OSs 15A, 23A, and 33A is an OS that operates on the hypervisor unit 40A, and is, for example, a Linux (registered trademark) OS.

The management domain unit (A) 10A detects an abnormality by communication with the hypervisor unit 40A. Specifically, this is as follows. An attack detection unit 11A detects whether or not a cyberattack is being carried out, or has been carried out or not (presence or absence of a cyberattack). An infection range identification unit 12A identifies a range of software that was infected by the cyberattack detected by the attack detection unit 11A. A system configuration unit 13A manages the management domain unit (A) 10A, the basic domain unit (A) 20A, the extended domain unit (A) 30A, and virtual networks 91 and 95, and reconfigures a system in accordance with the identified infection range. A configuration storage unit 14A stores domain configuration information 140 which holds information on presence/absence of a substitute basic domain portion (to be described later) in an ECU. An app (A1) 21A and an app (A2) 22A operate on the OS 23A, and an app (A3) 31A and an app (A4) 32A operate on the OS 33A, thereby implementing functions for the ECU (A) 1.

The management domain unit (A) 10A, the basic domain unit (A) 20A, and the extended domain unit (A) 30A are virtual machines managed by the hypervisor which the hypervisor unit 40A runs.

The management domain unit (A) 10A operates under the OS 15A being the third operating system, and halts operation of an extended domain unit (A) when an abnormality of the extended domain unit (A) 30A is detected. The management domain unit (A) 10A is provided with the attack detection unit 11A, the infection range identification unit 12A, the system configuration unit 13A, the configuration storage unit 14A, and the OS 15A. The OS 15A causes the attack detection unit 11A, the infection range identification unit 12A, the system configuration unit 13A, and the configuration storage unit 14A, to operate.

The basic domain unit (A) 20A operates under the OS 23A being the second operating system, is connected to the extended domain unit (A) 30A, and is required to continue operation when an abnormality occurs. The basic domain unit (A) 20A is provided with the app (A1) and the app (A2) that must keep operating even when they receive a cyberattack, among apps that implement the function of the ECU (A) 1, and the OS 23A that causes the app (A1) and the app (A2) to operate.

The extended domain unit (A) 30A operates under the OS 33A being the first operating system, is connected to the extra-vehicular network 88, and can be halted when an abnormality occurs. The extended domain unit (A) 30A is provided with apps not included in the basic domain (A) 20A, in other words, the app (A3) 31A and the app (A4) 32A whose functions may be halted when they receive a cyberattack, among the apps that implement the function of the ECU (A) 1, and the OS 33A that causes the app (A3) 31A and the app (A4) 32A to operate.

The intra-vehicular network 81 is virtualized with using a technique such as Virtual Local Area Network (ULAN). The intra-vehicular network 81 is connected, as a virtual network 91 being a logical network, only to a domain unit the intra-vehicular network 81 must communicate with.

Management domain units existing on the individual ECUs are connected via a dedicated virtual network 95.

For example, the management domain unit (A) 10A is connected, via the independent virtual network 95 using the hypervisor unit 40A, to a separate management domain unit (B) 10B of a separate ECU (B) 1 having the separate management domain unit (B) 10B and a separate basic domain unit (A) which substitutes for the basic domain unit (A) 20A.

The extra-vehicular network 88 is connected to only the extended domain unit (A) 30A. Also, the basic domain unit (A) 20A existing on the ECU 1 has, as a substitute, a domain unit (A) which has the same function on an ECU other than the ECU (A) 1. This domain unit (A) will be called a substitute basic domain unit.

In normal operation, the substitute basic domain unit waits in such a state that it can substitute for a basic domain unit having the same function when running of the basic domain unit is halted. FIG. 3 illustrates a case where the ECU (B) 1 has a substitute basic domain unit (A) 50B as a substitute basic domain unit having the same function as that of the basic domain unit (A) 20A of the ECU (A) 1. It suffices if at least one ECU among all ECUs excluding the ECU (A) 1 has a substitute basic domain unit having the same function as that of the basic domain unit (A) 20A.

Description of Operations

Figure 4:
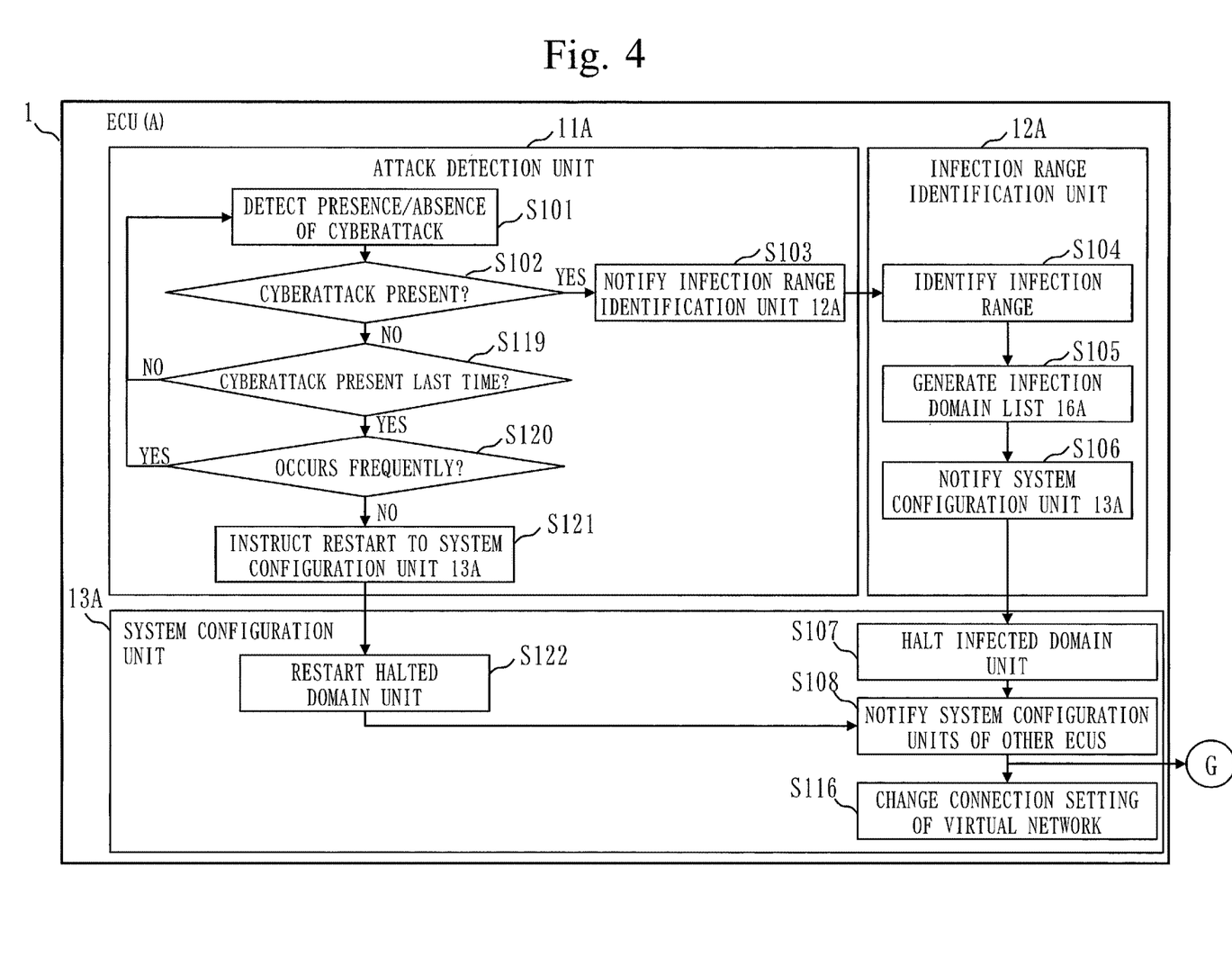
FIG. 4 is a drawing of Embodiment 1 which is a flowchart illustrating operations of the in-vehicle system 100.
Figure 5:
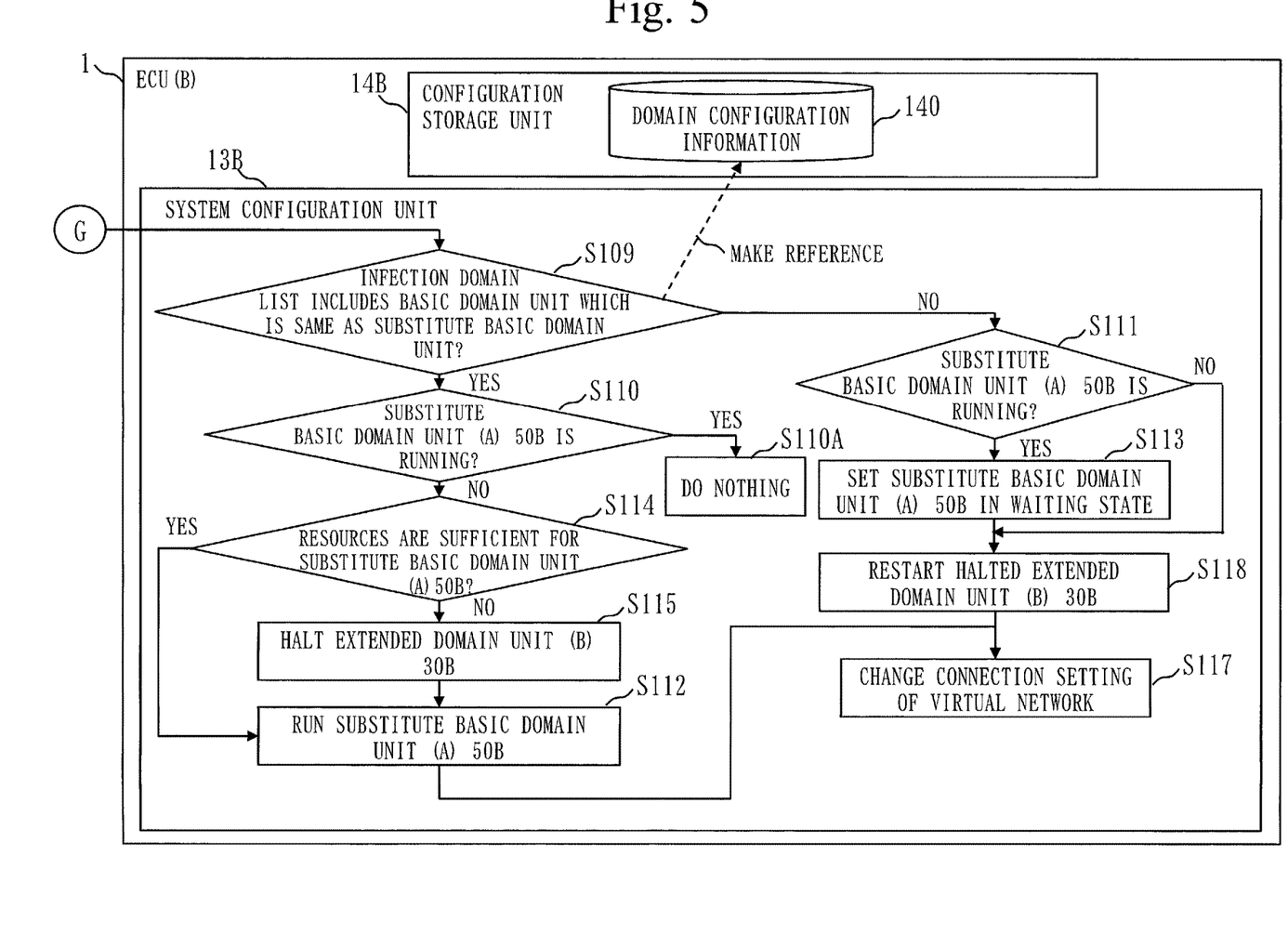
FIG. 5 is a drawing of Embodiment 1 which is a flowchart illustrating operations of the in-vehicle system 100.

FIGS. 4 and 5 are flowcharts illustrating operations of the in-vehicle system 100. The operations of the in-vehicle system 100 will now be described with referring to FIGS. 4 and 5.

First, operations of a case where a cyberattack occurs will be described. In the following description of the operations, an operation procedure of the ECU (A) 1 corresponds to a control method. A program that implements operations of the ECU (A) 1 corresponds to a control program.

In step S101, the attack detection unit 11A is started by a periodic event or a non-periodic event from the OS 15A and detects presence/absence of a cyberattack. The periodic event is, for example, an interruption generated by a timer controller. The non-periodic event is, for example, data transmission/reception between the extra-vehicular network 88 and the extended domain unit (A) 30A, between the extra-vehicular network 88 and the basic domain unit (A) 20A, or between the basic domain unit (A) 20A and the extended domain unit (A) 30A. If "necessary data" for detecting whether a cyberattack is present or not exists in the basic domain unit (A) 20A or in the extended domain unit (A) 30A, the attack detection unit 11A performs the following process. The attack detection unit 11A refers to the "necessary data" by data communication with the basic domain unit (A) 20A or extended domain unit (A) 30A via the hypervisor unit 40A, or by referring to a shared memory. The "necessary data" for detecting whether a cyberattack is present or not is, for example, a communication log between domain units, and an operation log of the OS 23A, OS 33A, app (A1) 21A, app (A2) 22A, app (A3) 31A, or app (A4) 32A. Embodiment 1 will not mention a detection method conducted by the attack detection unit 11A using the "necessary data.", for detecting whether a cyberattack is present or not.

In step S102, the attack detection unit 11A judges whether a cyberattack is present or not. If a cyberattack is present (YES in step S102), the attack detection unit 11A notifies the infection range identification unit 12A that presence of a cyberattack is detected (step S103).

In step S104, the infection range identification unit 12A identifies infection caused by the cyberattack in the basic domain unit (A) 20A and the extended domain unit (A) 30A. Note that the management domain unit (A) 10A is connected to only a management domain unit of another ECU via the independent dedicated virtual network 95. Hence, the management domain unit (A) 10A will not be infected by a cyberattack from the extended domain unit (A) 30A connected to the extra-vehicular network 88, or from the basic domain unit (A) 20A connected to the extended domain unit (A) 30A. Accordingly, the management domain unit (A) 10A is not an infection range detection target of the infection range identification unit 12A.

In step S105, the infection range identification unit 12A generates an infection domain list 16A which is a list of infected domain units.

Figure 6:
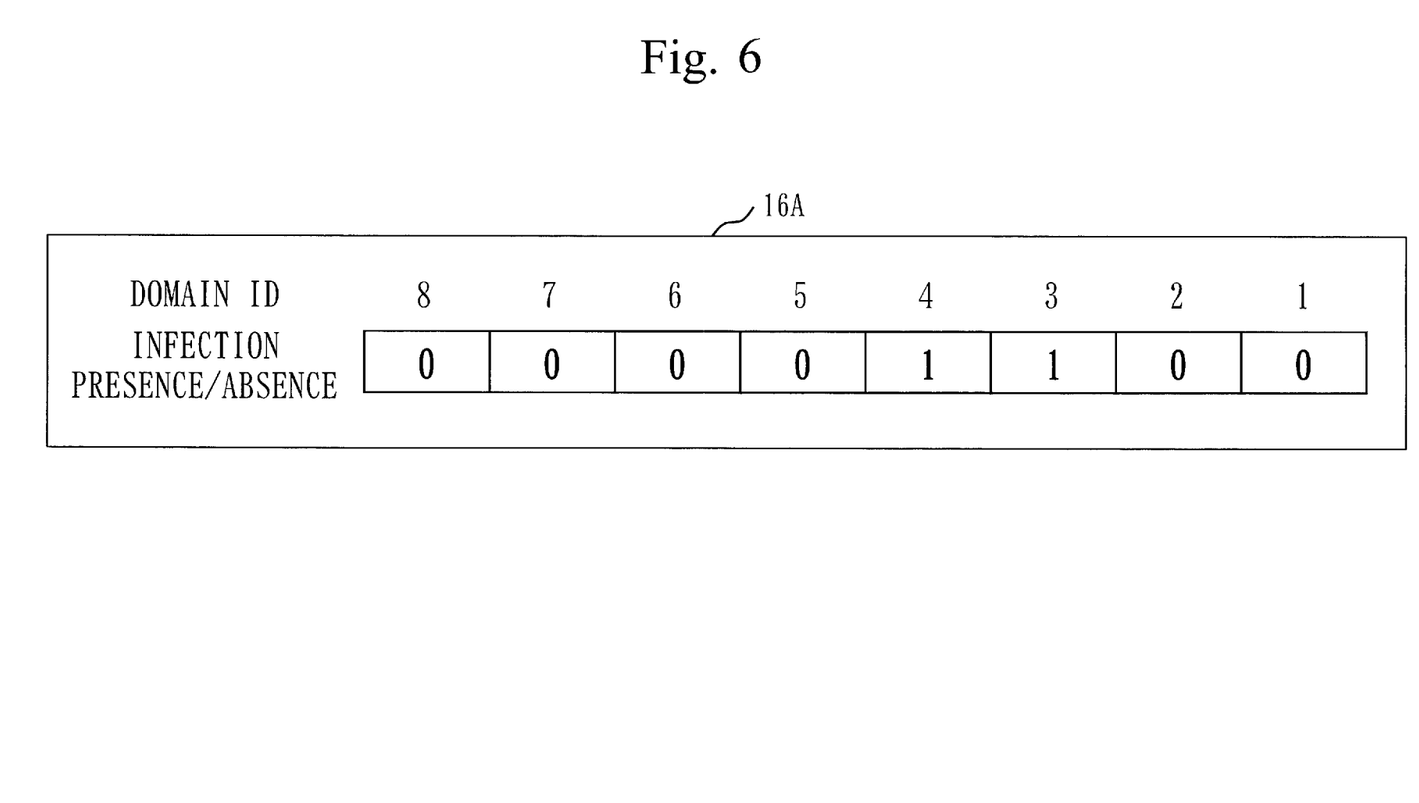
FIG. 6 is a drawing of Embodiment 1 illustrating an infection domain list 16A.

FIG. 6 illustrates the infection domain list 16A generated by the infection range identification unit 12A. As illustrated in FIG. 6, the infection domain list 16A is formed of domain IDs and infection presence/absence indicators associated with the domain IDs. Infection presence/absence is indicated by 0 and 1. If infection presence/absence is 0, it means that a domain unit designated by an associated domain ID is not infected. If infection presence/absence is 1, it means that a domain unit designated by an associated domain ID is infected. FIG. 6 illustrates that a domain unit designated by domain ID 3 and a domain unit designated by domain ID 4 are infected. If "necessary data." for identifying an infected range exists in the basic domain unit (A) 20A or in the extended domain unit (A) 30A, the infection range identification unit 12A identifies an infected range by referring to the "necessary data" for identifying the infected range, in the same manner as in a case described above where the "necessary data" for detecting whether a cyberattack is present or not is referred to. Embodiment 1 will not mention how the infected range is identified.

In step S106, the infection range identification unit 12A notifies the system configuration unit 13A of the infection domain list 16A.

When an abnormality of the basic domain unit (A) 20A is detected, the management domain unit (A) 10A halts operation of the basic domain unit (A) 20A (S107). Then, in step S112 to be described later, the management domain unit (A) 10A causes the separate management domain unit (B) 10B to start operation of the substitute basic domain unit (A) 50B which is a separate basic domain unit. Specifically, this is as fellows.

In step S107, the system configuration unit 13A of the management domain unit (A) 10A halts, via the hypervisor unit 40A, running of a domain unit described in the infection domain list 16A notified by the infection range identification unit 12A. The domain unit listed in the infection domain list 16A is the basic domain unit (A) 20A or the extended domain unit (A) 30A.

In step S108, the system configuration unit 13A notifies the system configuration units of all of the other ECUs, of the infection domain list 16A by domain-to-domain communication via the virtual network 95, so that information of the domain unit that has halted running is shared by all ECUs existing in the in-vehicle system 100. If the infection domain list 16A does not include the basic domain unit (A) 20A, the infection domain list 16A need not be notified.

A system configuration unit 13 of each ECU stores, in a configuration storage unit 14, the domain configuration information 140.

Figure 7:
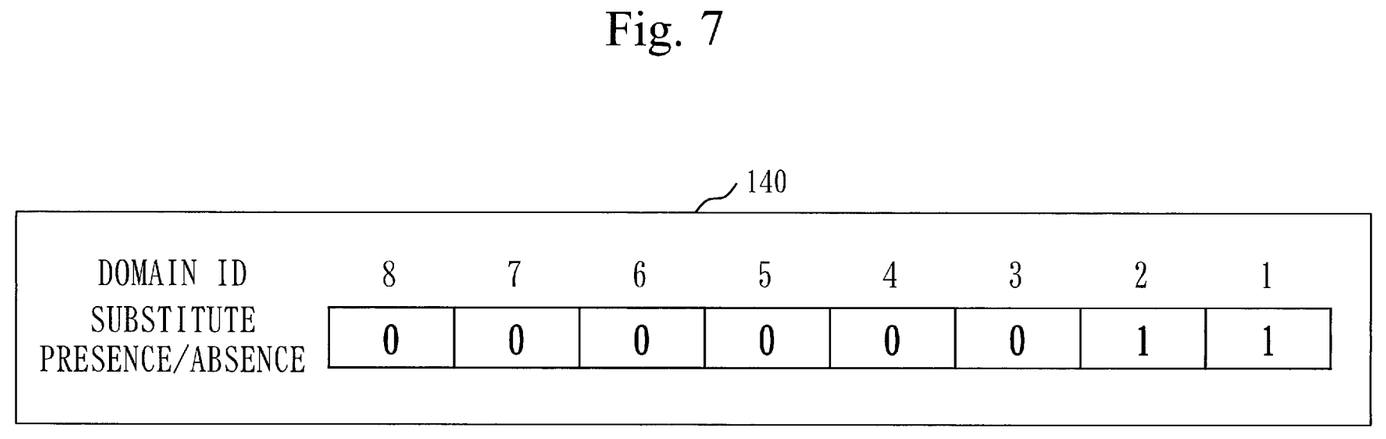
FIG. 7 is a drawing of Embodiment 1 illustrating domain configuration information 140.

FIG. 7 illustrates the domain configuration information 140 possessed by the ECU (B) 1, As illustrated in FIG. 7, the domain configuration information 140 is formed of domain IDs and substitute presence/absence indicators associated with the domain IDs. Substitute presence/absence is indicated by 0 and 1. If substitute presence/absence is 0, it means that a substitute domain unit of a domain unit designated by an associated domain ID does not exist. If substitute presence/absence is 1, it means that a substitute domain unit of a domain unit designated by an associated domain ID exists. FIG. 7 illustrates that a substitute domain unit whose domain ID is 1 and a substitute domain unit whose domain ID is 2 exist. FIG. 5 illustrates a state where the domain configuration information 140 is stored in a configuration storage unit 14B of the ECU (B) 1.

In step S109, a system configuration unit 13B of the ECU (B) 1 refers to the domain configuration information 140 and judges whether or not the notified infection domain list 16A includes the basic domain unit (A) 20A that forms a pair with the substitute basic domain unit (A) 50B possessed by the ECU (B) 1.

If the infection domain list 16A includes the basic domain unit (A) 20A that forms a pair with the substitute basic domain unit (A) 50B (YES in step S109), the system configuration unit 13B judges whether or not the substitute basic domain unit (A) 50B is running (step S110). If the system configuration unit 13B judges that the substitute basic domain unit (A) 50B is running (YES in step S110), the system configuration unit 13B does nothing. If the system configuration unit 13B judges that the substitute basic domain unit (A) SOB is not running (NO in step S110), processing proceeds to step S114. Step S114 and step S115 are optional processes, and the processing may proceed from step S114 to step S112.

If the infection domain list 16A does not include the basic domain unit (A) 20A that forms a pair with the substitute basic domain unit (A) SOB (NO in step S109) as well, the system configuration unit 13B judges whether or not the substitute basic domain unit (A) SOB is running (step S111).

In step S112, if the infection domain list 16A includes the basic domain unit (A) 20A that forms a pair with the substitute basic domain unit (A) SOB possessed by the ECU (B) 1 (YES in step S109) and if the substitute basic domain unit (A) (A) SOB is not running but is waiting (NO in step S110), the system configuration unit 13B cancels waiting of the substitute basic domain unit (A) SOB and runs the substitute basic domain unit (A) SOB.

In step S113, in a case where the infection domain list 16A does not include the basic domain unit (A) 20A that forms a pair with the substitute basic domain unit (A) SOB, if the substitute basic domain unit (A) SOB is running (YES in step S111), the system configuration unit 13B sets the substitute basic domain unit (A) SOB in a waiting state again, and halts the substitute basic domain unit (A) SOB. The system configuration unit 13B sets the substitute basic domain unit (A) SOB in the waiting state again because the substitute basic domain unit (A) SOB is not listed in the infection domain list 16A.

Before canceling the waiting state of the substitute basic domain unit (A) SOB and running the substitute basic domain unit (A) SOB in step S112, the system configuration unit 13B may judge whether resources for running the substitute basic domain unit (A) 50B are sufficient or not (step S114) by referring to a resource load such as an occupancy of the CPU 2B and a memory usage. If the resources are sufficient, the system configuration unit 13B advances the processing to step S112; if the resources are not sufficient, the system configuration unit 13B advances the processing to step S115.

In step S115, the system configuration unit 13B may halt an extended domain unit (B) 30B. When the extended domain unit (B) 30B is halted in step S115, after the substitute basic domain unit (A) 50B is set in the waiting state in step S113, the system configuration unit 13B may, in step S118, restart the extended domain unit (B) 30B that has been halted in step S115.

In the ECU (A) 1 and the ECU (B) 1, connection setting of the virtual network is changed in accordance with the post-substitution domain configuration of the basic domain unit. Regarding the ECU (A) 1, in step S116, the system configuration unit 13A changes connection setting of the virtual network 91. In the ECU (B) 1, the system configuration unit 13B changes connection setting of the virtual network 91 in step S117.

The operations of the in-vehicle system 100 in a case where the cyberattack that occurred has stopped will be described with referring to FIG. 4.

If the attack detection unit 11A judges presence/absence of a cyberattack in step S102, and if the judgement result indicates that a cyberattack is absent (NO in step S102), the attack detection unit 11A refers to cyberattack presence/absence judgement conducted the last time (step S119). If the last time result indicates presence of a cyberattack (YES in step S119), the attack detection unit 11A judges whether a cyberattack occurs frequently or not from one or a plurality of detection results that precede the last time (step S120). Whether the frequency is high or not can be determined by comparison with a preset frequency threshold value. If a number of detection times is larger than the threshold value, the attack detection unit 11A determines that the frequency is high. If the number of detection times is equal to or smaller than the threshold value, the attack detection unit 11A determines that the frequency is low.

If the frequency of cyberattacks is high, the processing returns to step S101 (YES in step S120).

When an abnormality of the extended domain unit (A) 30A is resolved, the management domain unit (A) 10A restarts the extended domain unit (A) 30A. When an abnormality of the basic domain unit (A) is resolved, the management domain unit (A) 10A restarts the basic domain unit (A) 20A. If the frequency of cyberattacks is low, the attack detection unit 11A instructs restart to the system configuration unit 13A in step S121.

In step S122, the system configuration unit 13A that has received the restart instruction restarts a halted domain unit (step S122). A halted domain unit is the extended domain unit (A) 30A to be connected to the extra-vehicular network 88, or the basic domain unit (A) 20A to be connected to the extended domain unit (A) 30A. Alternatively, the system configuration unit 13A may restart the basic domain unit (A) 20A or the extended domain unit (A) 30A by resetting the ECU (A) 1. Also, when restarting the basic domain unit (A) 20A, the system configuration unit 13A may perform the following process in order to prevent the basic domain unit (A) 20A in the in-vehicle system 100 from operating simultaneously with the substitute basic domain unit (A) 50B of the ECU (B) 1. That is, the system configuration unit 13A waits for restart of the basic domain unit until the substitute basic domain unit (A) 50B halts. The system configuration unit 13A can be notified whether the substitute basic domain unit (A) 50B is halted or running, from communication with the system configuration unit 13B via the virtual network 95.

In step S108, the system configuration unit 13A notifies the system configuration units 13 of all the other ECUs, of the infection domain list 16A in which the basic domain unit (A) 20A and the extended domain unit (A) 30A are set as not infected. This notice is transmitted by data communication via the virtual network 95. The system configuration unit 13A changes connection setting of the virtual network in accordance with post-restart domain configuration (step S116). Likewise, in the ECU (B) 1 that has received the infection domain list 16A being set as not infected, the system configuration unit 13B changes connection setting of the virtual network in accordance with the post-restart domain configuration (step S117).

Effect of Embodiment 1

(1) The system configuration unit halts an extended domain unit infected by the cyberattack (step S107). Therefore, a chain of infection from an extended domain to a basic domain unit can be prevented. Hence, the operations of the basic domain unit can be continued.

(2) When the cyberattack stops, the system configuration unit restarts the extended domain unit (step S122). Hence, the ECU can resume the operations of the extended domain unit.

(3) If infection reaches the basic domain unit, the system configuration unit halts the basic domain unit (step S107), and the system configuration also transmits the infection domain list 16A, so that the function of the infected basic domain unit is substituted by the substitute basic domain unit.

As a result, the operations of the basic domain unit can be continued.

(4) In the ECU (A) 1, when the cyberattack stops, the basic domain unit is restarted (step S122). Hence, a system configuration before receiving the cyberattack can be restored, and the operations can be continued.

(5) Management domain units are connected to each other via only the independent virtual network 95. As a result, the ECU can prevent infection invading from the extra-vehicular network 88. Hence, four functions, namely the attack detection unit, the infection range identification unit, the system configuration unit, and the configuration storage unit, which realize a mechanism that substitutes the function against a cyberattack or a failure, can be prevented from causing a defective operation due to the cyberattack.

(6) If a failure occurs in the ECU, the hypervisor unit notifies the system configuration unit of the failure.

The system configuration unit performs processing in the same manner as for a case where all the basic domain units and all the extended domain units on the ECU are infected by a cyberattack. As a result, even when a failure occurs in the ECU, the basic domain unit can be substituted by another ECU. Hence, the operations of the basic domain unit can be continued even if a failure occurs.

(7) The management domain unit (A) 10A performs survival confirmation of confirming whether or not a failure has occurred between the management domain unit (A) IDA and a separate management domain unit. As the system configuration units perform survival confirmation of each other, an ECU whose survival cannot be confirmed is considered as having caused a failure, and the same effect as that of a case where an ECU has caused a failure can be obtained.

(8) In the conventional in-vehicle system, some or all of the functions of the ECU are transferred to another ECU in advance to prepare for a failure. When a failure occurs, another ECU is running a transferred function. Therefore, even if a failure occurs in the ECU, the function will not be halted. This conventional scheme is effective against a failure.

With the conventional scheme, however, as for a cyberattack, as long as the cyberattack continues, the function transferred to another ECU will be infected again. Also, if a function itself that realizes the function-transferring mechanism causes a defective operation due to a cyberattack, the function cannot be transferred.

In contrast to this, since the ECU of Embodiment 1 is provided with a management domain unit, the problem of the conventional in-vehicle system can be solved, as described in items (1) to (5) in Effect of Embodiment 1.

Embodiment 2

An in-vehicle system 100 of Embodiment 2 will be described with referring to FIGS. 8 to 10. In Embodiment 1, the system configuration unit operates for an infected domain unit being a target. In Embodiment 2, when a system configuration is changed due to infection or a failure, the operations of the basic domain unit and of the extended domain unit are changed in accordance with the new system configuration. Operations are changed in step S201 and step S202 to be described later as the management domain unit sends to the hypervisor unit an operation change notice instructing operation change of at least either one or the other of the extended domain unit and the basic domain unit. The hypervisor unit causes at least either one or the other of the extended domain unit and the basic domain unit to change operation in accordance with the operation change notice. A system change notice to be described later is an operation change notice.

System configuration change includes a running start or running halt of the basic domain unit, a running start or running halt of an extended domain unit (A) 30A, and a running start or running halt of a substitute basic domain unit. That is, the system configuration change is a running start or running halt of at least either one of the basic domain unit, the extended domain unit, and the substitute basic domain unit.

A hardware configuration diagram of the in-vehicle system 100 of Embodiment 2 is the same as that of FIG. 1.

Figure 8:
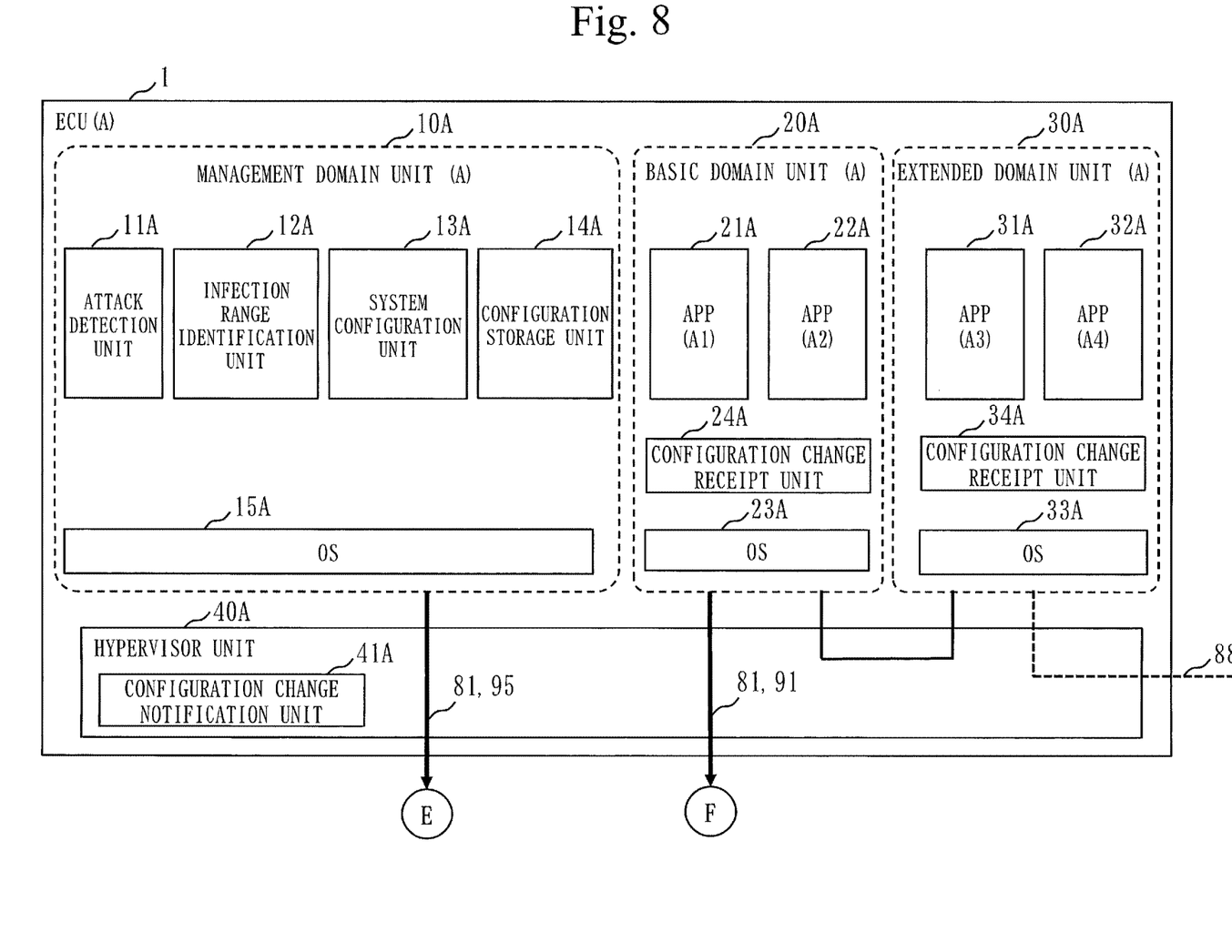
FIG. 8 is a drawing of Embodiment 2 which is a software configuration diagram of an ECU (A) 1.

FIG. 8 illustrates a software configuration of an ECU (A) 1, out of a software configuration of the in-vehicle system 100 of Embodiment 2. In the ECU (A) 1, a hypervisor unit 40A is provided with a configuration change notification unit 41A, a basic domain unit (A) 20A is provided with a configuration change receipt unit 24A, and the extended domain unit (A) 30A is provided with a configuration change receipt unit 34A. The ECU (A) 1 of FIG. 8 is connected to an ECU (B) 1 similar to that of FIG. 3. As ECU (B) 1 to which the ECU (A) 1 is connected has the same configuration as that of FIG. 3, its illustration is omitted. Note that the ECU (B) 1 whose illustration is omitted is provided with a configuration change notification unit 41B, a configuration change receipt unit 24B, and a configuration change receipt unit 34B, just as the ECU (A) 1 of Embodiment 2 is. An ECU (C) 1 and an ECU (D) 1 are each provided with a configuration change notification unit, a configuration change receipt unit, and a configuration change receipt unit, just as the ECU (B) 1 is.

Figure 9:
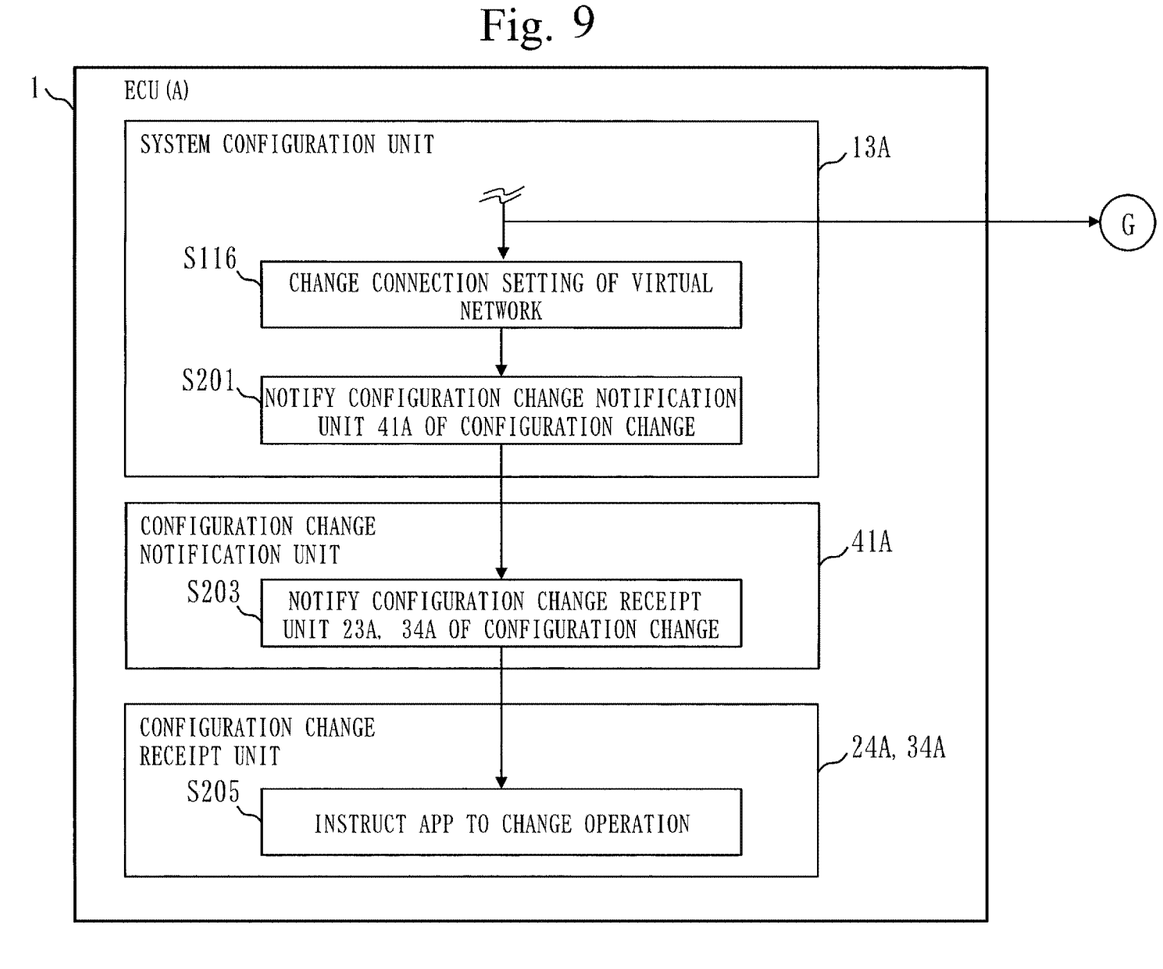
FIG. 9 is a drawing of Embodiment 2 which is a flowchart illustrating operations of an in-vehicle system 100.

FIG. 9 is a flowchart of operations of the ECU (A) 1 in Embodiment 2. The flowchart of FIG. 9 is formed by adding step S201, step S203, and step S205 to the flowchart of FIG. 4. In FIG. 9, steps preceding step S116 are not illustrated, Step S201 describes operations of a system configuration unit 13A; step S203 describes operations of the configuration change notification unit 41A; and step S205 describes operations of the configuration change receipt units 24A and 34A.

Figure 10:
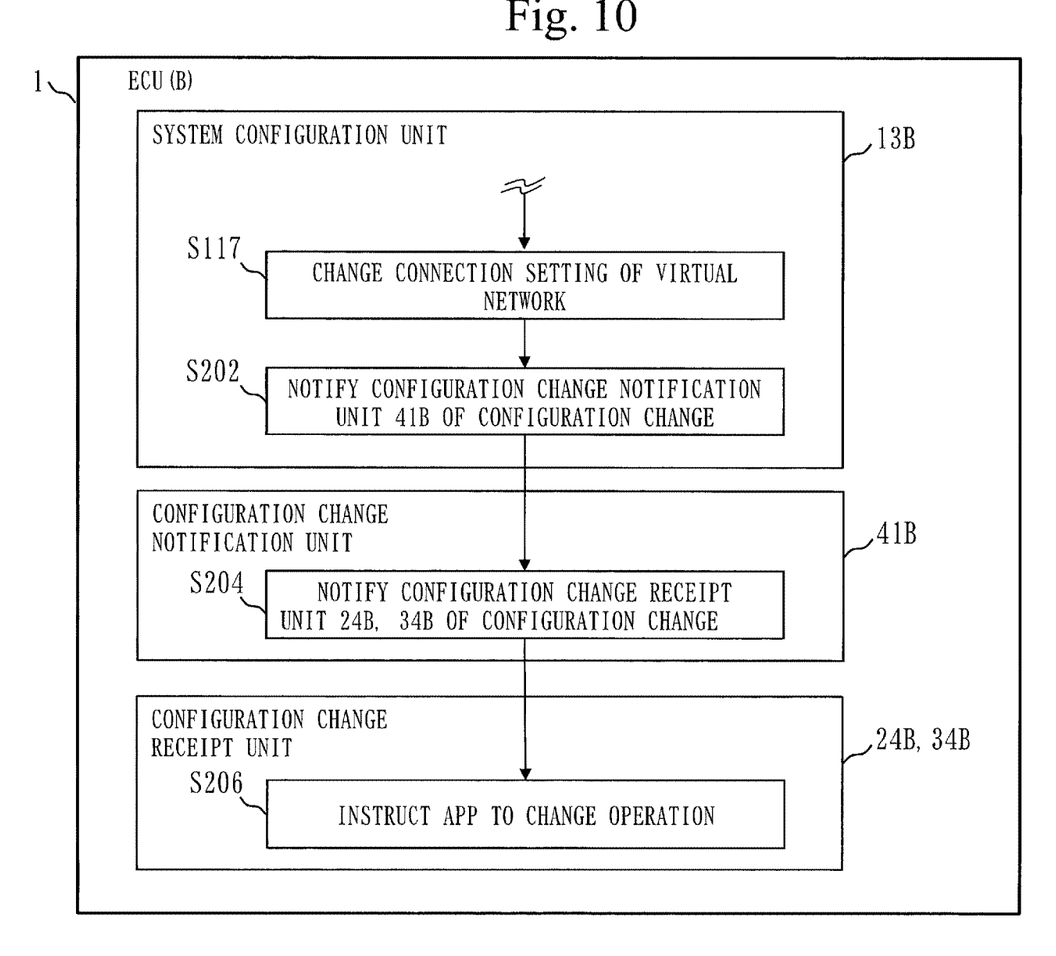
FIG. 10 is a drawing of Embodiment 2 which is a flowchart illustrating operations of the in-vehicle system 100.

FIG. 10 is a flowchart of operations of the ECU (B) 1 in Embodiment 2. The flowchart of FIG. 10 is formed by adding step S202, step S204, and step S206 to the flowchart of FIG. 5. In FIG. 10, steps preceding step S117 are not illustrated. Step S202 describes operations of a system configuration unit 13B; step S204 describes operations of the configuration change notification unit 41B; and step S206 describes operations of the configuration change receipt units 24B and 34B.

In step S203 and step S205 of FIG. 9, the configuration change notification unit 41A receives the system change notice from the system configuration unit 13A, and gives a configuration change instruction to the basic domain unit (A) 20A and the extended domain unit (A) 30A on the basis of the system change notice, so that system change is performed. The configuration change receipt unit 24A of the basic domain unit (A) 20A and the configuration change receipt unit 34A of the extended domain unit (A) 30A receive the configuration change instruction from the configuration change notification unit 41A, and notify corresponding apps of contents of the configuration change instruction.

In step S204 and step S206 of FIG. 10, the configuration change notification unit 41B receives a system change notice from the system configuration unit 13B, and gives a configuration change instruction to a basic domain unit (B) 20B and an extended domain unit (B) 30B on the basis of the system change notice, so that system change is performed. The configuration change receipt unit 24B of the basic domain unit (B) 20B and the configuration change receipt unit 34B of the extended domain unit (B) 30B receive the configuration change instruction from the configuration change notification unit 41B, and notify corresponding apps of contents of the configuration change instruction.

Operations of the in-vehicle system 100 of Embodiment 2 will be described with referring to FIGS. 9 and 10.

First, operations of a case where a cyberattack has occurred will be described. Operations from step S101 to step S118 are the same as those of Embodiment 1. After step S116 and step S117, the system configuration unit of each ECU sends a system change notice that the system configuration has been changed, to the configuration change notification unit of the hypervisor unit, via a corresponding OS or a device driver, using a means such as a hypervisor call (step S201, step S202). The system change notice that the system configuration has been changed is, for example, information that the extended domain unit (A) 30A of the ECU (A) 1 has been halted, which is notified with using the infection domain list 16A.

Upon reception of the system change notice, the configuration change notification unit takes, as a target, for example, an app of a domain unit that should perform a degenerating operation by configuration change, the app being related to change of the system configuration, and notifies the configuration change receipt unit of the configuration change instruction, using a means such as virtual interruption for example, (step S203, step S204).

Upon reception of the configuration change instruction, the configuration change receipt unit instructs operation change to each app, to perform, for example, a degenerating operation (step S205, step S206).

Operations in a case where a cyberattack that occurred has stopped will now be described.

Operations of step S102, step S119 to step S122, step S108, step S116, step S109 to step S115, step S117, and step S118 are the same as those of Embodiment 1.

After step S116 and step S117, the system configuration unit of each ECU sends a system change notice that the system configuration has been changed, to the configuration change notification unit of the hypervisor unit, via a corresponding OS or the device driver, using a means such as a hypervisor call (step S201, step S202), The system change notice that the system configuration has been changed is, for example, information that the extended domain unit (A) 30A of the ECU (A) 1 has started running, which is notified with using the infection domain list 16A.

The configuration change notification unit takes, as a target, for example, an app of a domain unit that should perform normal operation by configuration change, the app being related to the system change notice, and notifies the configuration change receipt unit of the configuration change instruction, using a means such as virtual interruption (step S203, step S204).

Upon reception of the configuration change instruction, the configuration change receipt unit instructs operation change to each app, to perform, for example, normal operation (step S205, step S206).

Also, when range identification of the infection range identification unit can be performed per app instead of per domain unit, running of only an app that no longer operates normally due to infection or a failure in the domain unit can be halted.

Effect of Embodiment 2

As has been described above, as change of the system configuration is notified by the system configuration unit with using a means such as a hypervisor call and a virtual interruption, the app of the domain unit can be notified that the system configuration has been changed, without using a network. Therefore, it is possible to perform operation change such as a degenerating operation without taking a security risk.

REFERENCE SIGNS LIST

1: ECU (A), ECU (B), ECU (C), ECU (D); 2A: CPU; 3A: ROM; 4A: RAM; 5A: peripheral controller; 6A, 7A, 8A, 9A: I/O; 10A: management domain unit (A); 11A: attack detection unit; 12A: infection range identification unit; 13A: system configuration unit; 14A: configuration storage unit; 15A: OS; 16A: infection domain list; 20A: basic domain unit (A); 21A: app (A1); 22A: app (A2); 23A: OS; 24A: configuration change receipt unit; 30A: extended domain unit (A); 31A: app (A3); 32A: app (A4); 33A: OS; 34A: configuration change receipt unit; 40A: hypervisor unit; 41A: configuration change notification unit; 10B: management domain unit (B); 11B: attack detection unit; 12B: infection range identification unit; 13B: system configuration unit; 14B: configuration storage unit; 15B: OS; 20B: basic domain unit (B); 21B: app (B1); 22B: app (B2); 23B: OS; 30B: extended domain unit (B); 31B: app (B3); 32B: app (B4); 33B: OS; 40B: hypervisor unit; 50B: substitute basic domain unit (A); 61: sensor; 71: actuator; 81: intra-vehicular network; 88: extra-vehicular network; 91, 95: virtual network; 100: in-vehicle system; 140: domain configuration information.

The invention claimed is:

1. An in-vehicle electronic control unit comprising processing circuitry,
the processing circuitry executing:
an extended function process which operates under a first operating system, is connected to an extra-vehicular network, and can be halted when an abnormality occurs;
a basic function process which operates under a second operating system, communicates with the extended function process, and is required to continue operation when an abnormality occurs;
a management function process which operates under a third operating system, and halts operation of the extended function process when the abnormality of the extended function process is detected; and
a hypervisor process which causes the first operating system, the second operating system, and the third operating system, to operate,
wherein the management function process is connected, via an independent virtual network using the hypervisor process, to a separate management function process of a separate electronic control unit having the separate management function process and a separate basic function process which substitutes for the basic function process; and when an abnormality of the basic function process is detected, the management function process halts operation of the basic function process, and causes the separate management function process possessed by the separate electronic control unit to start operation of the separate basic function process,
wherein the extended function process and the basic function process are electronic control processes of a vehicle, and wherein the processing circuitry causes the management function process to perform survival confirmation of confirming whether or not a failure has occurred between the management function process and the separate management function process, the failure being the abnormality.

2. The electronic control unit according to claim 1, wherein when the abnormality of the basic function process is resolved, the processing circuitry causes the management function process to restart the basic function process.

3. The electronic control unit according to claim 1, wherein the processing circuitry causes the management function process to detect the abnormality by communication with the hypervisor process.

4. The electronic control unit according to claim 1, wherein when the abnormality of the extended function process is resolved, the processing circuitry causes the management function process to restart the extended function process.

5. The electronic control unit according to claim 1, wherein the abnormality is infection caused by a cyber-attack.

6. The electronic control unit according to claim 1, wherein the abnormality is a failure.

7. The electronic control unit according to claim 1, wherein the processing circuitry causes the management function process to send to the hypervisor process an operation change notice instructing operation change of at least either one or the other of the extended function process and the basic function process, and
wherein the hypervisor process causes at least either one or the other of the extended function process and the basic function process to change operation in accordance with the operation change notice.

8. A non-transitory computer readable medium storing a program that causes a computer, being an in-vehicle electronic control unit, to perform:
an extended function process which operates under a first operating system, is connected to an extra-vehicular network, and can be halted when an abnormality occurs;
a basic function process which operates under a second operating system, communicates with the extended function process, and is required to continue operation when an abnormality occurs;
a management function process which operates under a third operating system, and halts operation of the extended function process when the abnormality of the extended function process is detected; and
a hypervisor process which causes the first operating system, the second operating system, and the third operating system, to operate,
wherein the management function process is connected, via an independent virtual network using the hypervisor process, to a separate management function process of a separate electronic control unit having the separate management function process and a separate basic function process which substitutes for the basic function process; and when an abnormality of the basic function process is detected, the management function process halts operation of the basic function process, and causes the separate management function process possessed by the separate electronic control unit to start operation of the separate basic function process, wherein the extended function process and the basic function process are electronic control processes of a vehicle, and wherein the computer causes the management function process to perform survival confirmation of confirming whether or not a failure has occurred between the management function process and the separate management function process, the failure being the abnormality.

* * * * *